United States Patent
Tan et al.

(10) Patent No.: US 10,809,089 B2
(45) Date of Patent: Oct. 20, 2020

(54) DEVICE AND METHOD FOR CONVOY NAVIGATION

(71) Applicant: MOTOROLA SOLUTIONS, INC., Chicago, IL (US)

(72) Inventors: Woei Chyuan Tan, Bayan Lepas (MY); Chin Chuan Yap, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 283 days.

(21) Appl. No.: 15/800,191

(22) Filed: Nov. 1, 2017

(65) Prior Publication Data
US 2019/0128695 A1    May 2, 2019

(51) Int. Cl.
*G01C 21/28* (2006.01)
*G01C 21/36* (2006.01)
*G01C 21/34* (2006.01)
*H04W 4/02* (2018.01)

(52) U.S. Cl.
CPC ......... *G01C 21/3655* (2013.01); *G01C 21/28* (2013.01); *G01C 21/3407* (2013.01); *G01C 21/3629* (2013.01); *H04W 4/02* (2013.01)

(58) Field of Classification Search
CPC ................ G01C 21/3655; G01C 21/3407
See application file for complete search history.

(56) References Cited

U.S. PATENT DOCUMENTS

| | | |
|---|---|---|
| 6,681,107 B2 | 1/2004 | Jenkins et al. |
| 7,813,743 B1 | 10/2010 | Loeb et al. |
| 2002/0177435 A1* | 11/2002 | Jenkins ................ H04M 3/487 |
| | | 455/412.1 |
| 2013/0331127 A1* | 12/2013 | Sabatelli ............... H04W 4/021 |
| | | 455/456.3 |
| 2015/0033271 A1* | 1/2015 | Lee ..................... H04N 21/858 |
| | | 725/93 |
| 2015/0271630 A1* | 9/2015 | Ferrara ................... H04W 8/18 |
| | | 455/456.3 |
| 2019/0037345 A1* | 1/2019 | Gao ....................... H04W 4/021 |
| 2019/0268906 A1* | 8/2019 | Perdomo ........... H04W 72/0453 |

OTHER PUBLICATIONS

Trossen, Dirk, et al., "Enabling User-Tailored MMS Delivery in Heterogeneous Access Scenarios", Nokia Research Center Boston, ICME 2003, IEEE.

* cited by examiner

*Primary Examiner* — Jess Whittington
(74) *Attorney, Agent, or Firm* — Perry+Currier, Inc.

(57) ABSTRACT

A device and method for convoy navigation is provided. An audio device comprises: a memory; a speaker; a communication interface; a location determining device; and a controller. The controller: receives, from a second audio device, via the communication interface, on a narrowband communication channel, audio information and an associated location of the second audio device, the associated location indicative of where the second audio device transmitted the audio information; stores, at the memory, the audio information and the associated location; tracks, using the location determining device, a current location of the audio device; and when the current location of the audio device is at about the associated location, controls the speaker to play the audio information.

18 Claims, 9 Drawing Sheets

DEVICE AND METHOD FOR CONVOY NAVIGATION

BACKGROUND OF THE INVENTION

In a vehicular convoy, for example of first responders such as police and/or firefighter vehicles, two-way radios may be used to navigate, with a convoy leader transmitting verbal navigation instructions to the other convoy members. However, when the convoy is in a city, and the like the convoy may disrupted, and convoy members in breakaway vehicles may have difficulties in following the convoy. Similarly, users who hike/trek in groups and/or convoys (e.g. professional search & rescue parties, consumer hikers), often rely on physical markings at a junction to follow an intended route. However, such physical markers may not be clear to all members of the group and/or such physical markers may change due to environment factors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides an audio device comprising: a memory; a speaker; a communication interface; a location determining device; and a controller configured to: receive, from a second audio device, via the communication interface, on a narrowband communication channel, audio information and an associated location of the second audio device, the associated location indicative of where the second audio device transmitted the audio information; store, at the memory, the audio information and the associated location; track, using the location determining device, a current location of the audio device; and when the current location of the audio device is at about the associated location, control the speaker to play the audio information.

Another aspect of the specification provides a method comprising: receiving, at a controller of an audio device, from a second audio device, via a communication interface, on a narrowband communication channel, audio information and an associated location of the second audio device, the associated location indicative of where the second audio device transmitted the audio information; storing, at a memory of the audio device, the audio information and the associated location; tracking, using a location determining device of the audio device, a current location of the audio device; and when the current location of the audio device is at about the associated location, controlling a speaker of the audio device to play the audio information.

Figure 1:
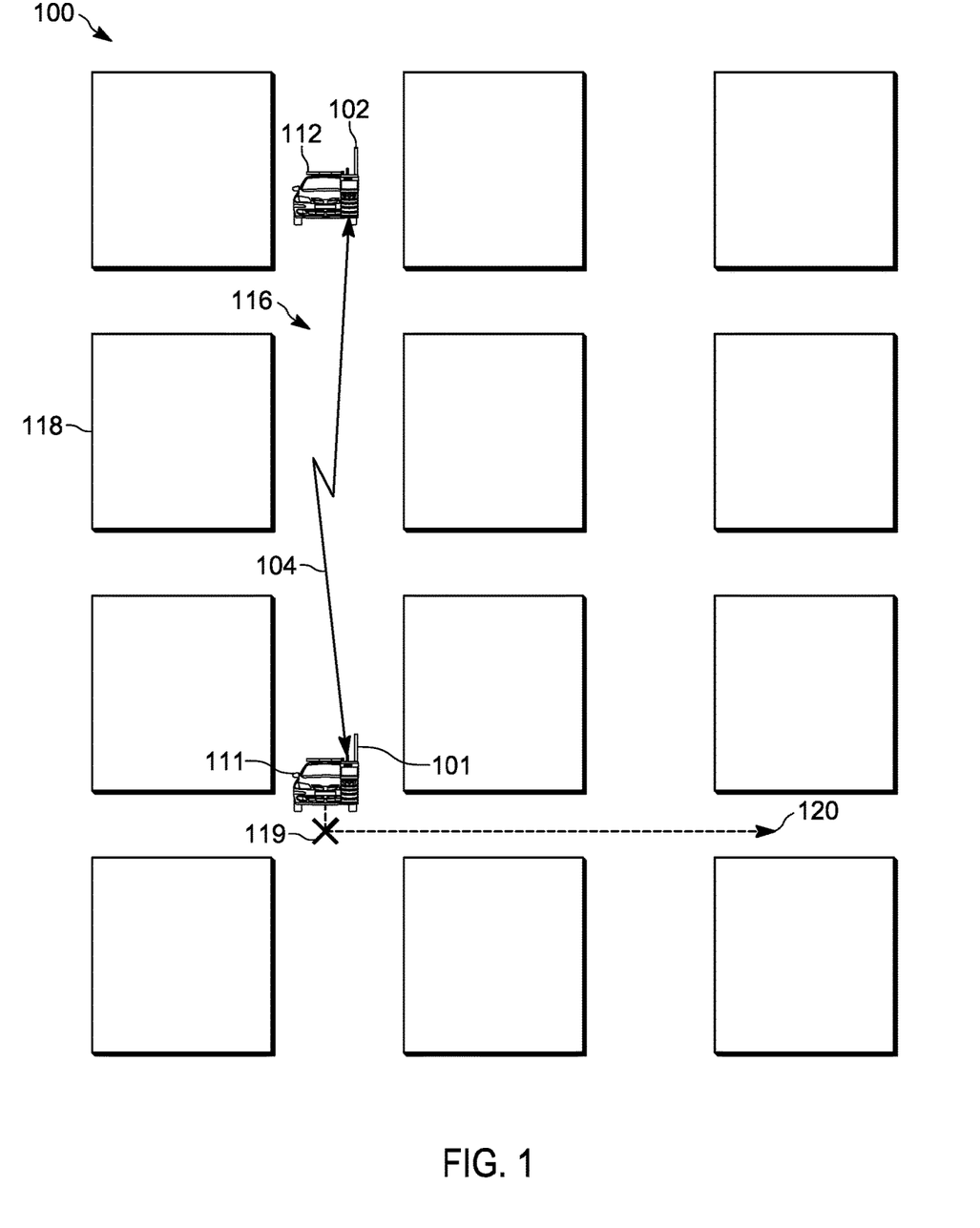
FIG. 1 depicts a system that includes audio devices for convoy navigation in accordance with some embodiments.

FIG. 1 is a block diagram of a system 100 that includes at least two audio devices 101, 102 in communication using a narrowband communication channel on a communication link 104. On particular, the at least two audio devices 101, 102 are being transported through a geographic region in a convoy, for example by respective vehicles 111, 112. The geographic region is depicted schematically and includes geographic features such as roads 116 and city blocks 118, for example.

In particular, the audio device 102 is following the audio device 101 (e.g. the vehicle 112 is following the vehicle 111). Hence, the audio device 101 may alternatively be referred to a "leader audio device" and/or a "convoy leader device". Similarly, the audio device 102 may alternatively be referred to a "follower audio device" and/or a "convoy follower device".

As depicted, when the leader audio device 101 reaches a geographic location 119, such as an intersection, the leader audio device 101 is transported through a turn (e.g. along a path 120), for example by the vehicle 111. A user (not depicted) of the leader audio device 101 operates the leader audio device 101 to transmit audio information to the follower audio device 102, for example, to inform a user (not depicted) of the follower audio device 102 to make a similar turn along at the geographic location 119 to follow the path 120.

As will be described in more detail below, the audio information is transmitted with the geographic location 119 and/or an indication of the geographic location 119, for example in a control message and/or a header of a voice message transmitted from the leader audio device 101 to the follower audio device 102. The follower audio device 102 generally stores, in a memory, the audio information with the associated geographic location 119; and, when a current location of the follower audio device 102 is at about the associated geographic location 119, the follower audio device 102 controls a speaker thereof to play the audio information. Hence, the audio information is played at the follower audio device 102 in a location-specific manner.

As depicted the at least two audio devices 101, 102 include various physical platforms, including, but not limited to, a vehicle and/or and a mobile communication device, such as a land-mobile radio (LMR), two-way radio, and the like. For example, one or more of the at least two audio devices 101, 102 may comprise a radio, and the like, at a police vehicle, of a respective responder (e.g. a driver and/or a passenger of the police vehicle). Alternatively, one or more of the at least two audio devices 101, 102 may include a mobile communication device carried by a responder, such as a police officer, on foot or on a bicycle or on a motorcycle, a horse, and the like. However, any type of physical platform for the at least two audio devices 101, 102 is within the scope of the present specification.

In particular, however, each of the at least two audio devices 101, 102 includes a speaker, but may not include a display device; in other words, the present specification is directed to a device and method of convoy navigation that are compatible with communication devices that include speakers, but not display devices.

While two audio devices 101, 102 are depicted, a number of the audio devices 101, 102 may include more than two audio devices 101, 102, depending, for example, on a number of responders and/or users, and the like, travelling in a convoy.

Furthermore, while example embodiments are described herein with respect to the responders and/or users of the audio devices 101, 102 being police officers, for example dispatched to respond to an incident, other types of responders may be dispatched (e.g. via the at least two audio devices 101, 102) including, but not limited to, first responders, firefighters, paramedics, and the like. However, the responders need not have been dispatched but may, for example, be involved in high speed chase through the geographic region. Indeed, any initiation of the convoy of audio devices 101, 102 is within the scope of present embodiments.

Each of the at least two audio devices 101, 102 may be carried and/or transported and/or operated by one or more respective responders and/or users (not depicted), such as police officers, and the like. However, the at least two audio devices 101, 102 may alternatively be carried and/or transported and/or operated by users who are not first responders, including, but not limited to, hikers. Furthermore, at least two audio devices 101, 102 may be transported through a geographic location that is not a city and the like, including, but not limited, to hiking trails, wilderness, and the like. Indeed, in the present specification, any group of users travelling together and using at least two audio devices 101, 102 to communicate to convey navigation instructions are understood be a convoy.

Each of the at least two audio devices 101, 102 are generally configured to communicate using narrowband communication channels including, but not limited to, public safety narrowband (PSNB) voice communications, for example as used by police, fire, and other emergency responders. In particular, each of the at least two audio devices 101, 102 may be generally configured to communicate using the Project 25 (P25) standards used with land-mobile radios and/or two-way radios; however other types of narrowband standards and/or communications standards are within the scope of the present specification, including other types of land-mobile radio standards and/or two-way radio standards. Regardless, a narrowband communication channel used by the at least two audio devices 101, 102 to communicate may include a voice channel.

In some embodiments, a portion of the at least two audio devices 101, 102, regardless of their physical configuration, may generally comprise a mobile device which includes, but is not limited to, any suitable combination of land-mobile radio (LMR) mobile devices, two-way radios, walkie-talkies, and the like and/or any other type of audio device configured for narrowband radio communications. Such devices may include, but are not limited to, communication devices, portable electronic devices, mobile computing devices, portable computing devices, tablet computing devices, telephones, PDAs (personal digital assistants), cellphones, smartphones, mobile camera devices and the like. In other words, smartphones, and the like, may be adapted for use with narrowband communications channels.

Furthermore, one or more of the at least two audio devices 101, 102, may be a component of a vehicle 111, 112, and the like (for example police cars, emergency service vehicles and the like), such as a radio, an emergency radio, and the like. In embodiments where an audio device 101, 102 comprises a vehicle, such an audio device 101, 102 may be a component of a vehicle area network (VAN).

In some embodiments, one or more of the at least two audio devices 101, 102 may be specifically adapted for emergency service radio functionality, and the like, used by emergency responders and/or emergency responders, including, but not limited to, police service responders, fire service responders, emergency medical service responders, and the like. In some of these embodiments, the at least two audio devices 101, 102 further includes other types of hardware for emergency service radio functionality, including, but not limited to, push-to-talk ("PTT") functionality.

Figure 2:
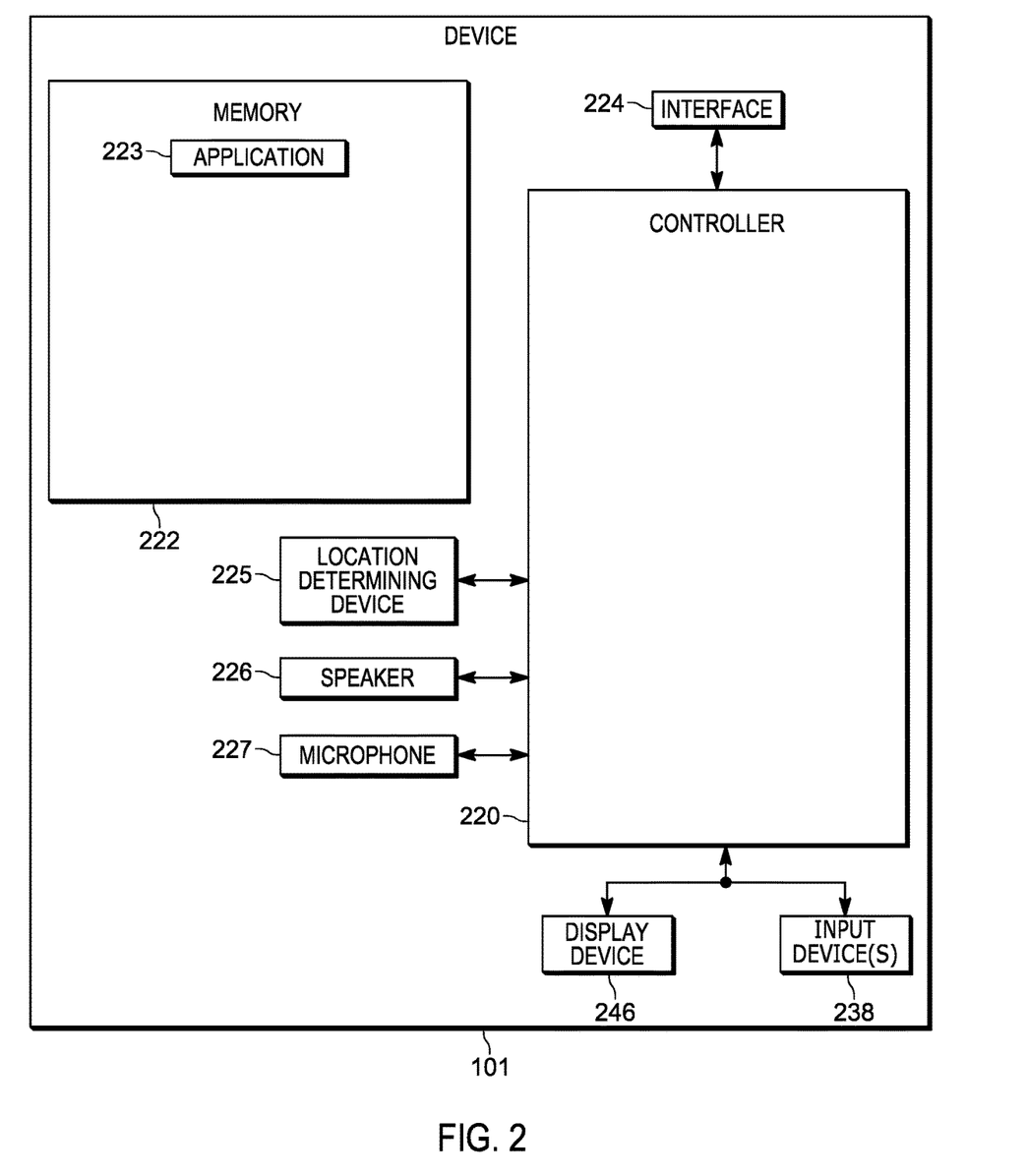
FIG. 2 depicts a block diagram of a leader audio device for convoy navigation in accordance with some embodiments.
Figure 3:
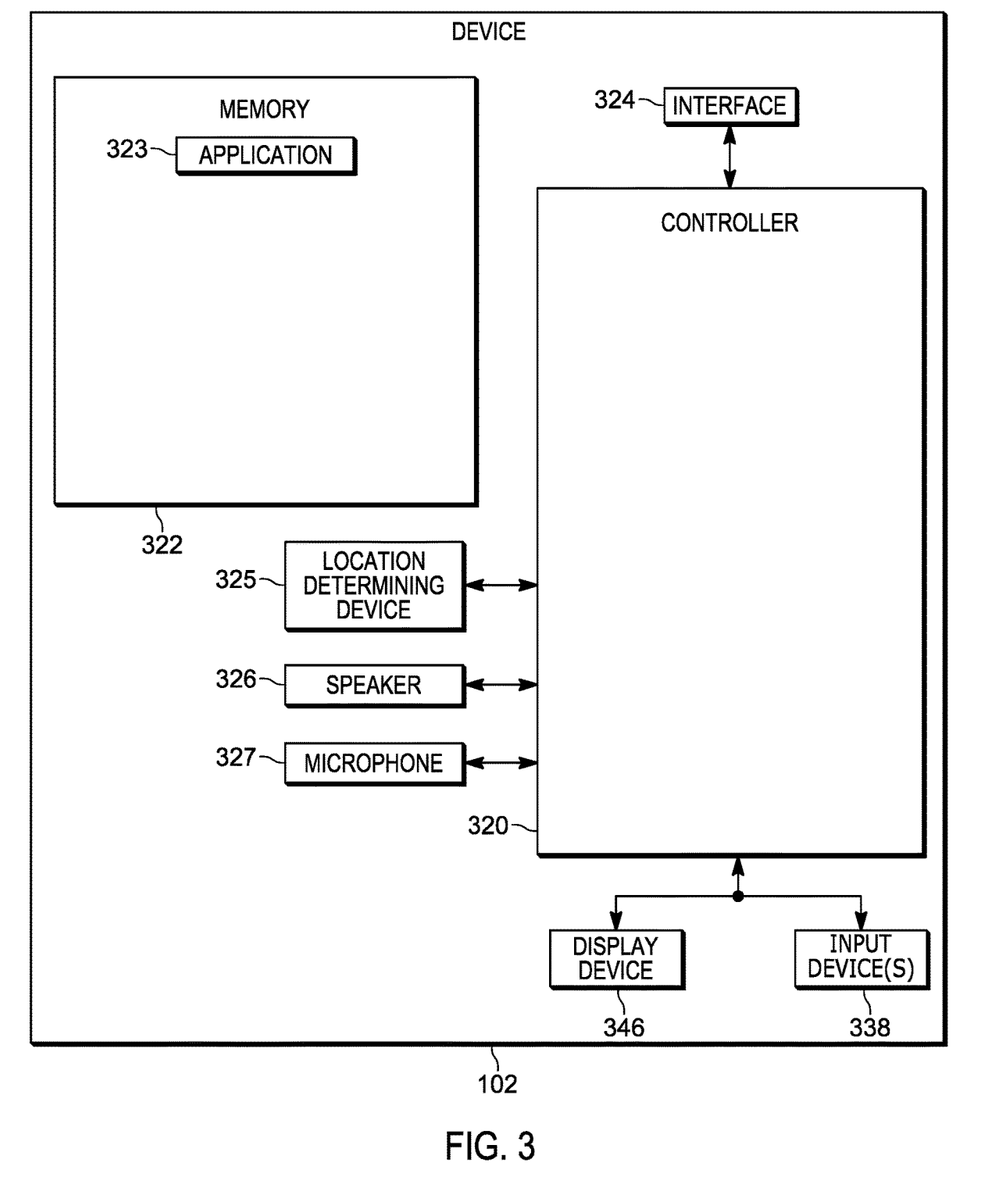
FIG. 3 depicts a block diagram of a follower audio device for convoy navigation in accordance with some embodiments.

Attention is next directed to FIG. 2 and FIG. 3 which respectively depict block diagrams of the audio devices 101, 102. With reference to FIG. 2, the leader audio device 101 comprises: a controller 220, a memory 222, storing an application 223, a communication interface 224, interchangeably referred to hereafter as the interface 224, a location determining device 225, a speaker 226, a microphone 227, at least one input device 238, and optionally a display device 246. The controller 220 is generally configured for communication with the follower audio device 102, using the communication interface 224.

Similarly, with reference to FIG. 3, the leader audio device 101 comprises: a controller 320, a memory 322, storing an application 323, a communication interface 324, interchangeably referred to hereafter as the interface 324, a location determining device 325, a speaker 326, a microphone 327, at least one input device 338, and optionally a display device 346. The controller 320 is generally configured for communication with the leader audio device 101, using the communication interface 324.

Each of the controllers 220, 320 includes one or more logic circuits, one or more processors, one or more microprocessors, one or more ASIC (application-specific integrated circuits) and one or more FPGA (field-programmable gate arrays). In some embodiments, each of the controllers 220, 320 and/or the audio devices 101, 102 are not generic controllers and/or generic devices, but devices specifically configured to implement convoy navigation functionality. For example, in some embodiments, each of the controllers 220, 320 and/or the audio devices 101 specifically comprises a computer executable engine configured to implement specific convoy navigation functionality.

Each of the memories 222, 322 include a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")).

With reference to FIG. 2, programming instructions (e.g., machine readable instructions) that implement the functional teachings of the leader audio device 101 as described herein are maintained, persistently, at the memory 222 and used by the controller 220 which makes appropriate utilization of volatile storage during the execution of such programming instructions.

In particular, the memory 222 of FIG. 2 stores instructions corresponding to the application 223 that, when executed by the controller 220, enables the controller 220 to implement "leader" convoy navigation functionality associated with the application 223, with the leader audio device 101 being in a "leader mode". In the examples described herein, when the controller 220 executes the application 223, the controller 220 is enabled to: receive, via the microphone 227, audio information; and transmit, using the communication interface 324, on a narrowband communication channel, the audio information and an associated location of the leader audio device 101, the associated location indicative of where the leader audio device 101 was located when the leader audio device 101 transmitted the audio information, the associated location determined using the location determining device 225. Furthermore, when the controller 220 executes the application 223, the controller 220 is further enabled to transmit trigger data to the follower audio device 102, which causes the controller 320 at the follower audio device 102 to store the audio information transmitted by the leader audio device 101, as well as the associated location.

With reference to FIG. 3, programming instructions (e.g., machine readable instructions) that implement the functional teachings of the follower audio device 102 as described herein are maintained, persistently, at the memory 322 and used by the controller 320 which makes appropriate utilization of volatile storage during the execution of such programming instructions.

In particular, the memory 322 of FIG. 3 stores instructions corresponding to the application 323 that, when executed by the controller 320, enables the controller 320 to implement "follower" convoy navigation functionality associated with the application 323, with the leader audio device 101 being in a "follower mode". In the examples described herein, when the controller 320 executes the application 323, the controller 320 is enabled to: receive, from audio device 101, via the communication interface 324, on a narrowband communication channel, audio information and an associated location of the leader audio device 101, the associated location indicative of where the leader audio device 101 transmitted the audio information; store, at the memory 322, the audio information and the associated location; track, using the location determining device, a current location of the audio device; and when the current location of the follower audio device 102 is at about the associated location, control the speaker 326 to play the audio information.

Furthermore, while the applications 223, 323 have been described as causing respective controllers 220, 320 to implement different aspects convoy navigation functionality, in some embodiments, the applications 223, 323 may be similar and may include both "leader" convoy navigation functionality and "follower" convoy navigation functionality, the respective functionality of an audio device 101, 102 being selected depending on whether an audio device 101, 102 is to be operated in a leader mode or a follower mode. Hence, the leader audio device 101 may be switched from a "leader" mode to a "follower" mode, and the follower audio device 102 may be switched from a "follower" mode to a "leader" mode.

Each of the interfaces 224, 324 are generally configured to enable the audio devices 101, 102 to communicate over a narrowband communication channel using the wireless link 104. The wireless link 104 may include but is not limited to, a WiFi links, a radio link, a cellphone link, and the like. In other words, the link 104 may include any suitable combination of wireless networks, though a portion of such wireless networks may include wired networks. Such wireless networks may include a vehicle area network, and the like.

Each of the interfaces 224, 324 may be implemented by, for example, one or more radios and/or connectors and/or network adaptors, configured to communicate wirelessly, with network architecture that is used to implement one or more communication channels, including at least one narrowband communication channel, between the at least two audio devices 101, 102. In these embodiments, each of the interfaces 224, 324 may include, but are not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, each of the interfaces 224, 324 includes one or more local area network or personal area network transceivers operating in accordance with an IEEE 902.11 standard (e.g., 902.11a, 902.11b, 902.11g), or a Bluetooth™ transceiver which may be used for communication therebetween (e.g. assuming that one or more of the at least two audio devices 101, 102 are within range of such a local area network or personal area network transceiver).

In general, however, each of the interfaces 224, 324 are further configured to communicate "radio-to-radio" on narrowband communication channels. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

However, in other embodiments, each of the interfaces 224, 324 communicates therebetween using other servers and/or communication devices, for example by communicating with the other servers and/or communication devices using, for example, packet-based and/or internet protocol communications, and the like, and the other servers and/or communication devices use radio communications to wirelessly communicate with the one or more at least two audio devices 101, 102.

In other words, while present embodiments are described with respect to audio information and an associated location being transmitted over a narrowband communication channel, in other embodiments, the audio information and an associated location may be transmitted over broadband communication channel and/or other types of channels.

Each of the location determining devices 225, 325 may include, but is limited to, one or more of Global Positioning System (GPS) device, a Globalnaya Navigazionnaya Sputnikovaya Sistema (GLONASS device), a triangulation device, and the like.

Each of the speaker devices 226, 326 generally comprises any combination of speakers (including, but not limited to headphones and/or a headset connected (wirelessly or via wires) to a respective audio device 101, 102) that may be controlled by a respective controller 220, 320 for example to play and/or output audio information.

Similarly, each of the microphones 227, 327 generally comprises any combination of microphones (including, but not limited to headphones and/or a headset connected (wirelessly or via wires) to a respective audio device 101, 102) that may receive audio information that may be played and/or output by the speakers 226, 326.

Each of the input devices 238, 338 comprises any suitable one of, or combination of keyboards, pointing devices, touchpads, touchscreens, buttons, and the like.

In particular, in some embodiments, each of the input devices 238, 338 includes a push-to-talk key (PTT key) which, when operated, causes audio information received at a respective microphone 227, 327 to be transmitted to all audio devices in a currently active talkgroup, for example the audio devices 101, 102; for example, when a PTT key is operated at the leader audio device 101, audio information (e.g. sound converted to data for transmission) received at the microphone 227 is transmitted to the follower audio device 102 over a narrowband communication (e.g. voice) channel.

Furthermore, in some embodiments, each of the input devices 238, 338 may include an input device for turning a convoy navigation functionality on or off, as described below.

The optional display devices 246, 346 comprises any suitable one of, or combination of, flat panel displays (e.g. LCD (liquid crystal display), plasma displays, OLED (organic light emitting diode) displays) and the like, as well as one or more optional touch screens (including capacitive touchscreens and/or resistive touchscreens). As depicted in FIG. 1, neither of the audio devices 101, 102 are shown in with a display device and indeed, the convoy navigation functionality as described herein is independent of either of the audio devices 101, 102 including a display device. Put another way, in some embodiments, the follower audio device 102 is lacking (and/or lacks) a display device; and similarly, in some embodiments, the leader audio device 101 is lacking (and/or lacks) a display device.

Each of the audio devices 101, 102 further includes a power source (not depicted) such as a battery and/or a connection to a battery of a vehicle transporting an audio device 101, 102, and the like, configured to power the components of the audio devices 101, 102.

In yet further embodiments, each of the audio devices 101, 102 may include an internal clock (not depicted, but including, but not limited to, a timing clock, and the like, of a respective controller 220, 320) and/or a speed determining device (not depicted), such as an accelerometer and the like. Either way, at least the follower audio device 102 may be configured to determine a speed thereof; for example, the speed of the follower audio device 102 may be determined using current locations as determined using the location determining device 325 and an internal clock of the controller 320.

In any event, it should be understood that a wide variety of configurations for each of the audio devices 101, 102 are within the scope of present embodiments.

Figure 4:
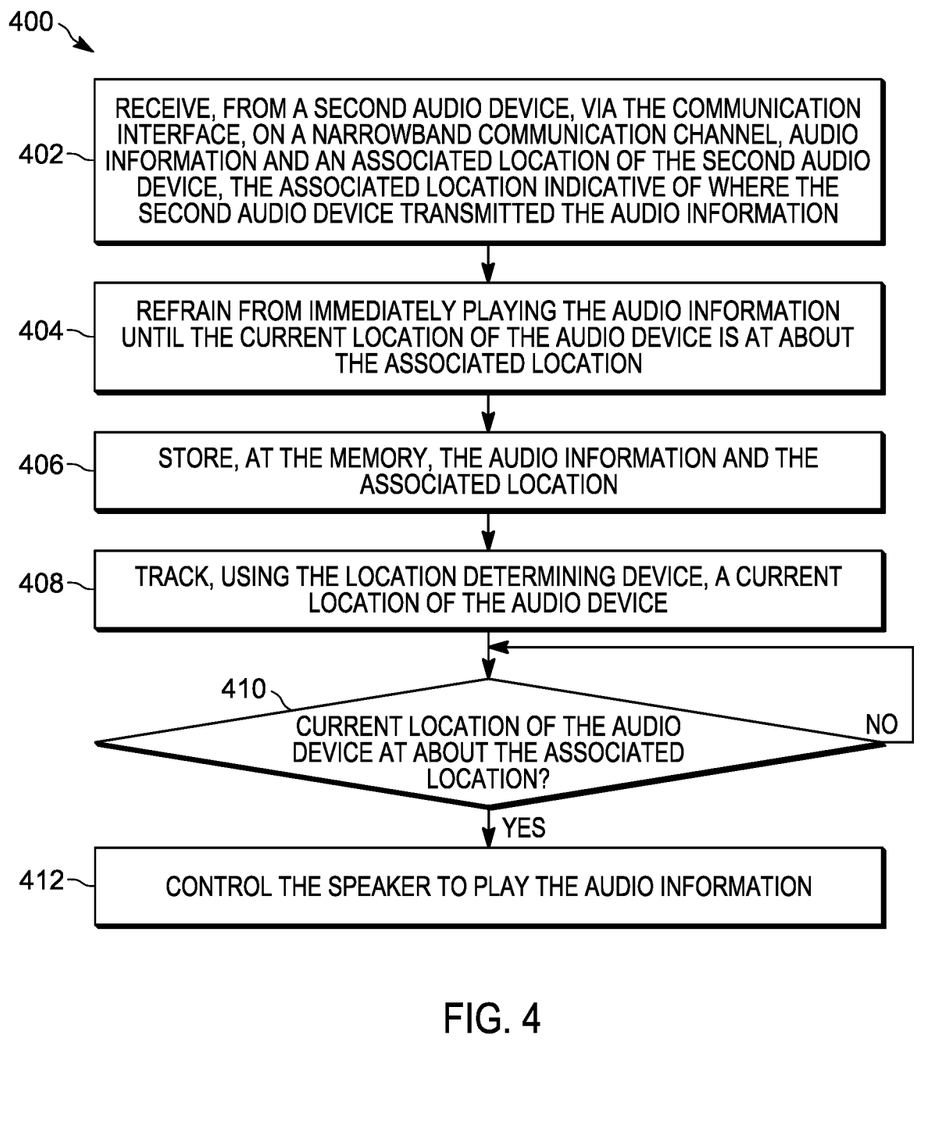
FIG. 4 is a flowchart of a method of convoy navigation in accordance with some embodiments.

Attention is now directed to FIG. 4 which depicts a flowchart representative of a method 400 for convoy navigation. In some embodiments, the operations of the method 400 of FIG. 4 correspond to machine readable instructions that are executed by, for example, the follower audio device 102 of FIG. 1, and specifically by the controller 320 of the follower audio device 102. In the illustrated example, the instructions represented by the blocks of FIG. 4 are stored at the memory 322, for example, as the application 323. The method 400 of FIG. 1 is one way in which the follower audio device 102 and/or the controller 320 and/or the system 100 is configured. Furthermore, the following discussion of the method 400 of FIG. 4 will lead to a further understanding of the system 100 and the follower audio device 102, and its various components.

However, it is to be understood that the leader audio device 101, the follower audio device 102 and/or the controller 320 and/or the method 400 and/or the system 100 may be varied, and need not work exactly as discussed herein in conjunction with each other, and that such variations are within the scope of present embodiments.

Furthermore, the method 400 of FIG. 4 need not be performed in the exact sequence as shown and likewise various blocks may be performed in parallel rather than in sequence. Accordingly, the elements of method 400 are referred to herein as "blocks" rather than "steps".

At a block 402, the controller 320 receives, from a second audio device (e.g. the leader audio device 101), via the communication interface 324, on a narrowband communication channel, audio information and an associated location of the second audio device, the associated location indicative of where the second audio device transmitted the audio information.

At an optional block 404, the controller 320 refrains from immediately playing the audio information until the current location of the follower audio device 102 is at about the associated location. However, in other embodiments, the controller 320 plays the audio information as it's received, as well as when the current location of the follower audio device 102 is at about the associated location as describe below.

At a block 406, the controller 320 store, at the memory 322, the audio information and the associated location.

At a block 408, the controller 320 tracks, using the location determining device 325, a current location of the follower audio device 102.

At a block 410, the controller 320 determines when the current location of the audio device is at about the associated location. When the current location of the audio device is not at about the associated location (e.g. a "NO" decision at the block 410), the controller 320 continues to implement the block 410.

When the current location of the audio device is at about the associated location (e.g. a "YES" decision at the block 410), the controller 320 controls the speaker 326 to play the audio information.

Example embodiments of the method 400 will now be described with respect to FIG. 5 to FIG. 9.

Figure 5:
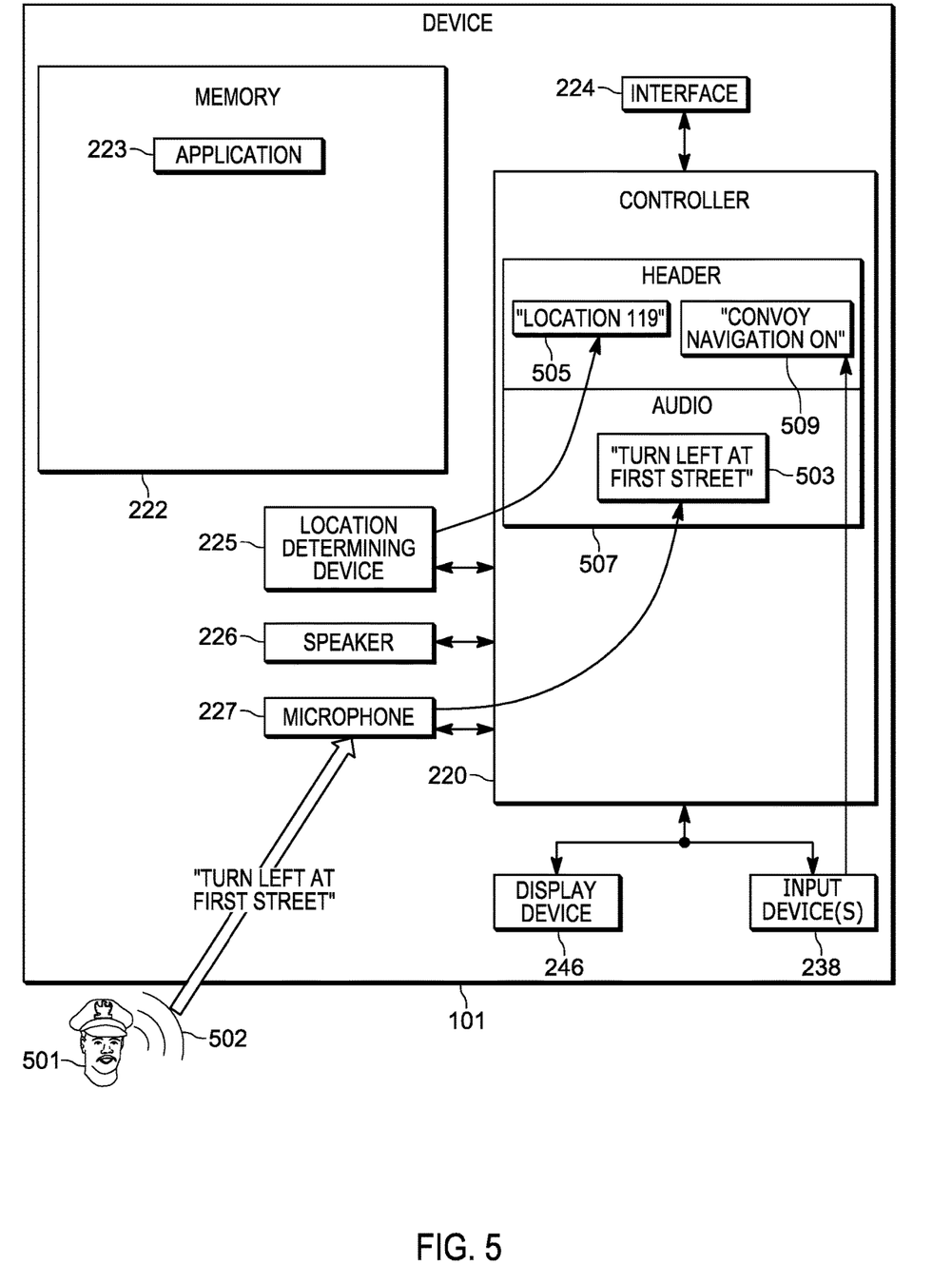
FIG. 5 depicts the leader audio device receiving audio information that includes navigation instructions and an associated location in accordance with some embodiments.

Attention is first directed to FIG. 5, which is substantially similar to FIG. 2, with like elements having like numbers. In FIG. 5, it is assumed that the convoy navigation functionality has been turned on at the leader audio device 101, for example, via a user 501 of the leader audio device 101 operating the input device 238 (e.g. using a switch, a button, a key, and the like). Further, in FIG. 5, the leader audio device 101 is depicted as receiving, at the microphone 227, audio information 503 including navigation instructions to be implemented at the geographic location 119. In particular, the user 501 (e.g. a police officer and the like) may be operating a PTT key at the leader audio device 101, which causes sound 502 received at the microphone 227 to be converted to the audio information 503. As depicted, audio information includes navigation instructions "Turn Left At First Street".

Furthermore, the controller 320 determines, using the location determining device 225, an associated location 505. The associated location 505 generally comprise data indicative of a location (e.g. the geographic location 119) where the leader audio device 101 transmits the audio information 503 to the follower audio device 102, as described hereafter. As depicted, the associated location 505 comprises an indication of the geographic location 119, assuming that the audio information 503 is received at about the geographic location 119, and that the audio information 503 is transmitted to the follower audio device 102 as the audio information 503 is received (e.g. at about the geographic location 119).

However, the associated location 505 may indicative of a location either before or after the geographic location 119 depending on when the audio information 503 is transmitted. In other words, the user 501 may send navigation instructions prior to reaching the geographic location 119 or after travelling through the geographic location 119. It will nonetheless be assumed hereafter that navigation instructions are transmitted as the audio information 503 at about the geographic location 119.

While the associated location 505 is depicted as a textual indication "Geographic location 119" of the geographic location 119, the associated location 505 generally comprises location coordinates, and the like, compatible with the location determining device 325 at the follower audio device 102, such as GPS coordinates, and the like. However, any type of indication of the associated location 505 is within the scope of the present specification, as is any type of conversion of the indication of the associated location 505 to other formats compatible with the location determining device 325 (the conversion occurring either at the leader audio device 101 and/or the follower audio device 102).

As also depicted in FIG. 5, the controller 220 assembles the audio information 503 and the associated location 505 into a message 507 that includes, for example, a header portion ("Header") (interchangeably referred to hereafter as the header) and an audio portion ("Audio"). The header includes the associated location 505 embedded and/or located therein, as well as trigger data 509 which causes the controller 320 at the follower audio device 102 to store the audio information 503 with the associated location 505, for playback at about the associated location 505.

As depicted, the trigger data 509 includes textual instructions to turn "Convoy Navigation On", however the trigger data 509 may alternatively comprises a code, and the like, indicating that the follower audio device 102 is to store the audio information 503 with the associated location 505 for playback at about the associated location 505.

For example, in FIG. 5, the user 501 has turned on the convoy navigation functionality via the input device 238, which causes the trigger data 509 to be included in the header portion. Such operation of the input device 238 causes the leader audio device 101 to operate in the "leader" mode where any audio information is transmitted with a respective location.

As depicted, the audio portion includes the audio information 503. For example, in some embodiments, the message 507 comprises a voice message with the audio information 503 being automatically played at the speaker 326 of the follower audio device 102 upon receipt of the voice message.

Alternatively, the audio information 503 may be stored in another portion of the message 507 including, but not limited to, the header, and/or the message 507 may comprise a control message such that the audio information 503 is not immediately played at the speaker 326 of audio device 102 upon receipt of the control message.

Figure 6:
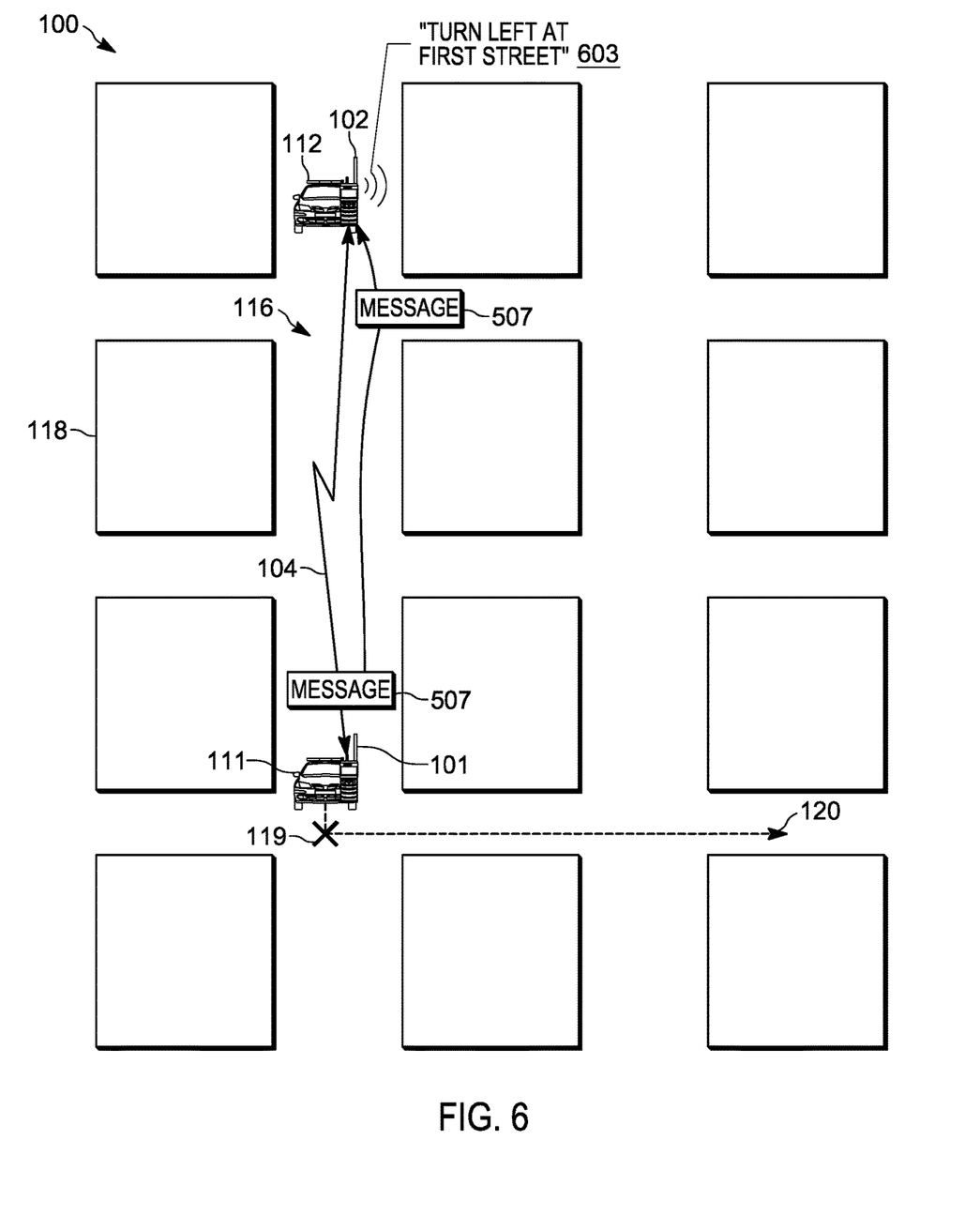
FIG. 6 depicts the leader audio device transmitting a message to the follower audio device, the message including the audio information and the associated location in accordance with some embodiments.

With reference to FIG. 6, which is substantially similar to FIG. 1, with like elements having like numbers, the leader audio device 101 transmits the message 507, at the geographic location 119, using the link 104, for example using a narrowband communication channel, such as a voice channel, as described above.

Hence, in FIG. 6, the follower audio device 102 receives (e.g. at the block 402 of the method 400), from the leader audio device 101, via the communication interface 324, on a narrowband communication channel, the audio information 503 and the associated location 505 of the leader audio device 101, the associated location 505 indicative of where the leader audio device 101 transmitted the audio information 503 (e.g. the geographic location 119).

In some embodiments, as depicted, the controller 320 of the follower audio device 102 is configured to control the speaker 326 to play the audio information 503 when the audio information 503 is received, for example as sound 603. Indeed, such embodiments occur when the message 507 comprises a voice message.

However, in other embodiments, the controller 320 refrains (e.g. at the block 404 of the method 400) from immediately playing the audio information 503 until the current location of the follower audio device 102 is at about the associated location 505.

For example, in these embodiments, the message 507 may comprise a link control message consistent with the P25 standard and/or a similar embedded signaling message that may be user in other types of narrowband and/or land-mobile radio standards. In other words, such link control messages may be different from message which include audio information to be immediately played at the speaker 326 and may include trunking data and/or signaling data.

Hence, in embodiments where the block 404 is implemented, one or more of the audio information 503 and the associated location 505 of the follower audio device 102 may be embedded in a control message received from the leader audio device 101, for example in a header portion and/or an audio portion and/or any other portion of a control message.

Alternatively, the presence of the trigger data 509 may cause the controller 320 to refrain from immediately playing the audio information 503 regardless of the format of the message 507; in other words, in these embodiments, when the message 507 comprises a voice message that includes the trigger data 509, the controller 320 refrains from playing the audio information 503.

Figure 7:
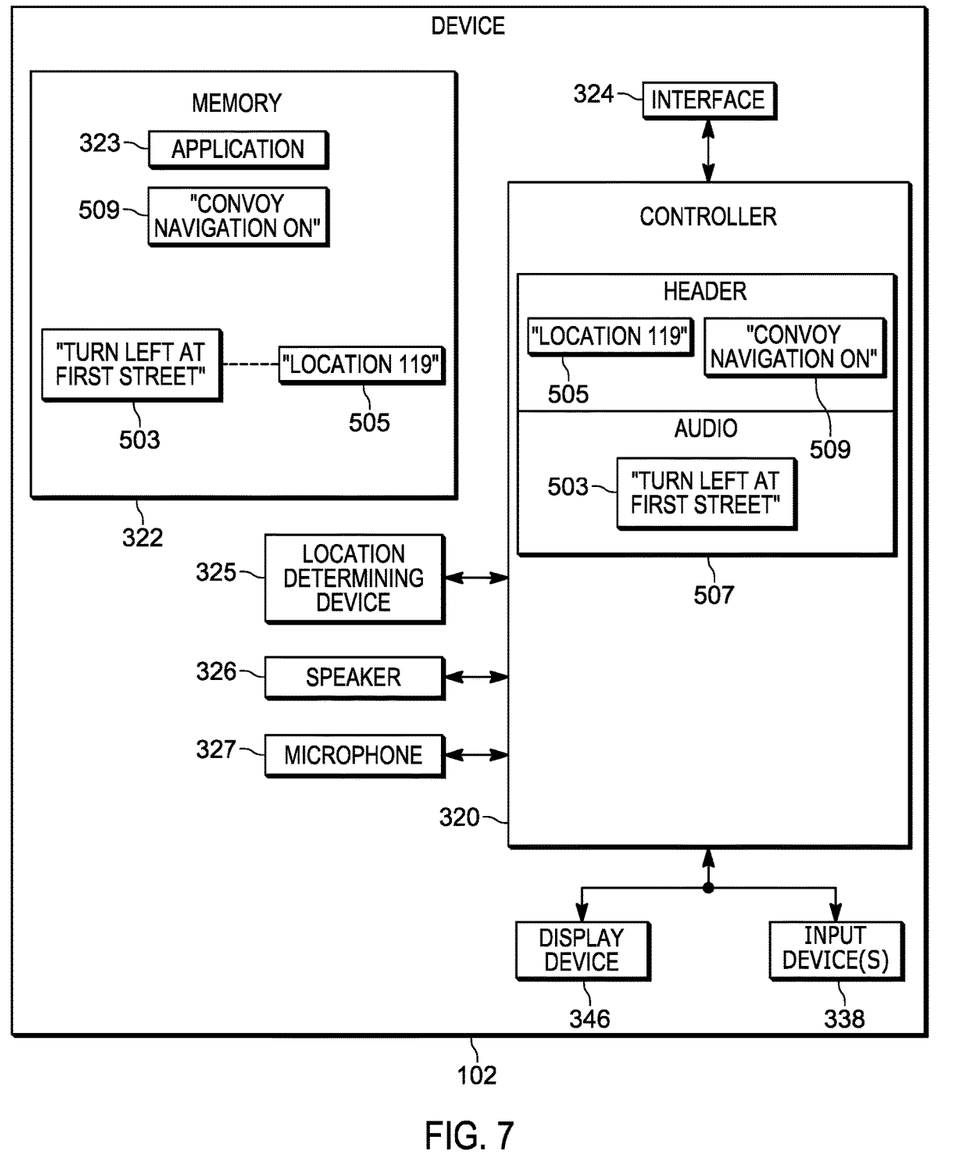
FIG. 7 depicts the follower audio device receiving the message and storing the audio information and the associated location in a memory in accordance with some embodiments.

Attention is next directed to FIG. 7 which is substantially similar to FIG. 3, with like elements having like numbers. In FIG. 3, it is assumed that the controller 320 of the follower audio device 102 has implemented the block 402 of the method 400 and has hence received the audio information 503 and the associated location 505, for example in the message 507. Optional block 404 may be implemented or not implemented (e.g. as depicted in FIG. 6).

Furthermore, as the audio information 503 has been transmitted with a header that includes including trigger data 509, the trigger data 509 causes the controller 320 to store (e.g. at the block 406 of the method 400) the audio information 503, as well as the associated location 505, at the memory 322. Such receipt of the trigger data 509 causes the follower audio device 102 to operate in the "follower" mode, where received audio information is played by the speaker 326 at about an associated location.

Indeed, the trigger data 509 may generally cause the convoy navigation functionality of the follower audio device 102 to be turned on, such that any audio information received with a respective associated location is stored at the memory 322 for playback at the speaker at the respective associated location; indeed, in some of these embodiments, any audio information received with a respective associated location is stored at the memory 322 for playback at the speaker at the respective associated location regardless of whether audio information received with a respective location is received with similar trigger data or not. In other words, once the trigger data 509 causes the convoy navigation functionality to be turned on, any further audio information received with a respective location may be stored in the memory 322 for playback at about the respective location, regardless of whether the further audio information received with a respective location is received in a control message or a voice message.

Hence, for example, receipt of the trigger data 509 may cause the controller 320 to refrain from playing audio information received with a respective associated location in voice messages until the current location of the follower audio device 102 is at about the respective associated location. Put another way, the controller 320 may defer playing audio information received with a respective associated location in voice messages until the current location of the follower audio device 102 is at about the respective associated location.

As depicted, the trigger data 509 is stored in the memory 322 to indicate that the convoy navigation functionality has been turned on. In particular, the convoy navigation functionality has been turned on automatically without receiving any input from the input device 338. However, the input device 338 may be generally configured to turn off storing of audio information with a respective location. Indeed, the input device 338 may be generally configured for turning the convoy navigation functionality on or off using, for example a switch, a button, a key and the like. For example, the input device may include an input device switch configured to turn off storing of audio information, and the method 400 may include turning off storing of the audio information via the input device switch.

Figure 8:
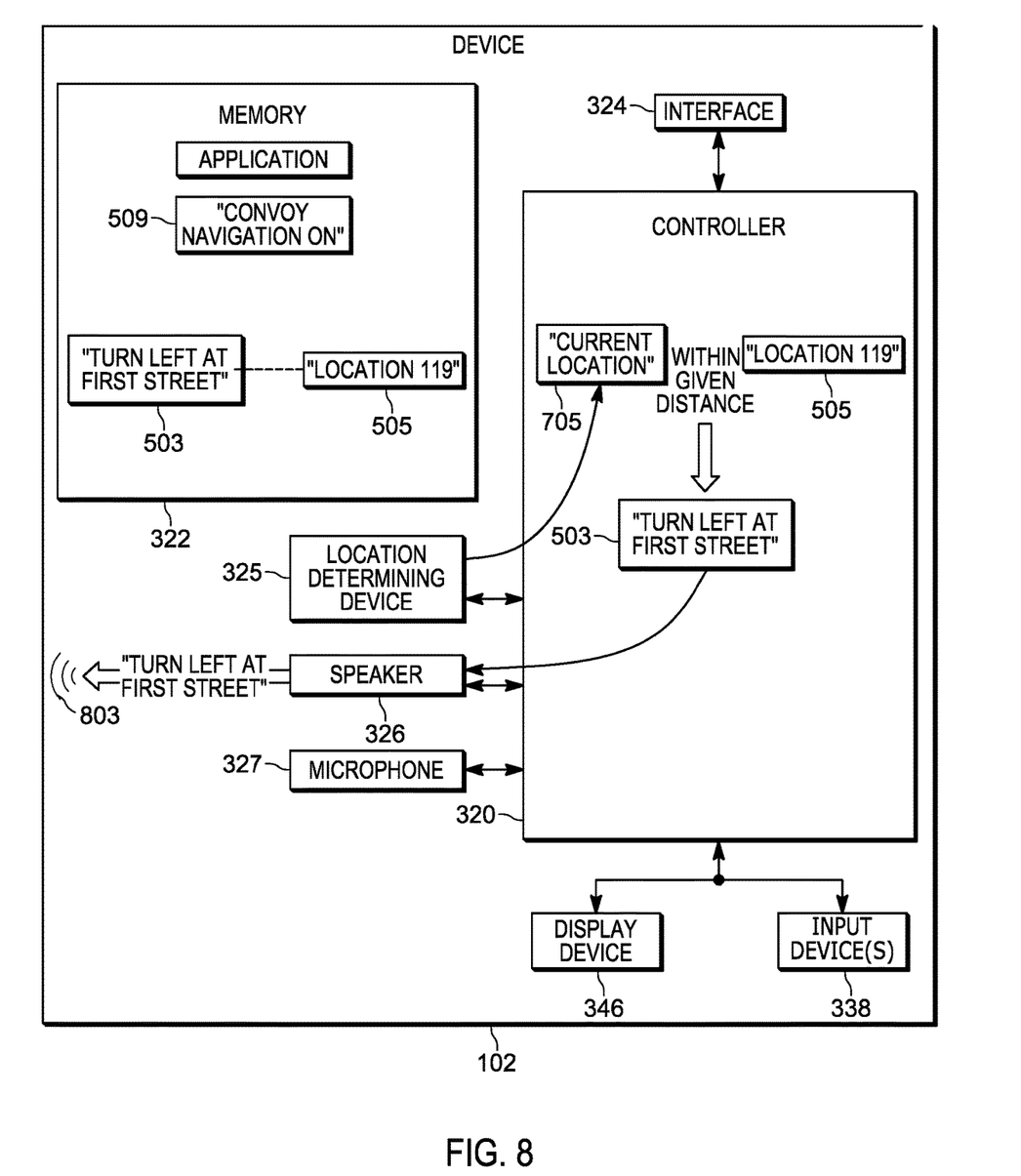
FIG. 8 depicts the follower audio device playing the audio information at a speaker when a current location is at about the associated location in accordance with some embodiments.

Attention is next directed to FIG. 8, which is substantially similar to FIG. 7, with like elements having like numbers. However, in FIG. 8, the controller 320 is implementing the blocks 408, 410, 412 of the method 400.

In particular, the controller 320 is tracking (e.g. at the block 408 of the method 400) a current location 705 of the follower audio device 102 using the location determining device 325. The controller 320 compares (e.g. at the block 410 of the method 400) the current location 705 with the associated location 505; as described above, the controller 320 may alternatively convert the current location 705 and/or the associated location 505 to compatible formats.

When the current location 705 is at about the associated location 505 (e.g. a "YES" decision at the block 410), the controller 320 controls (e.g. at the block 412) the speaker 326 to play the audio information 503. As depicted, the audio information 503 is output as sound 803 at the speaker 326.

As described hereafter, the controller 320 may be further configured to determine that the current location 705 of the follower audio device 102 is at about the associated location 505 when the current location 705 of the follower audio device 102 is within a given distance of the associated location 505.

Figure 9:
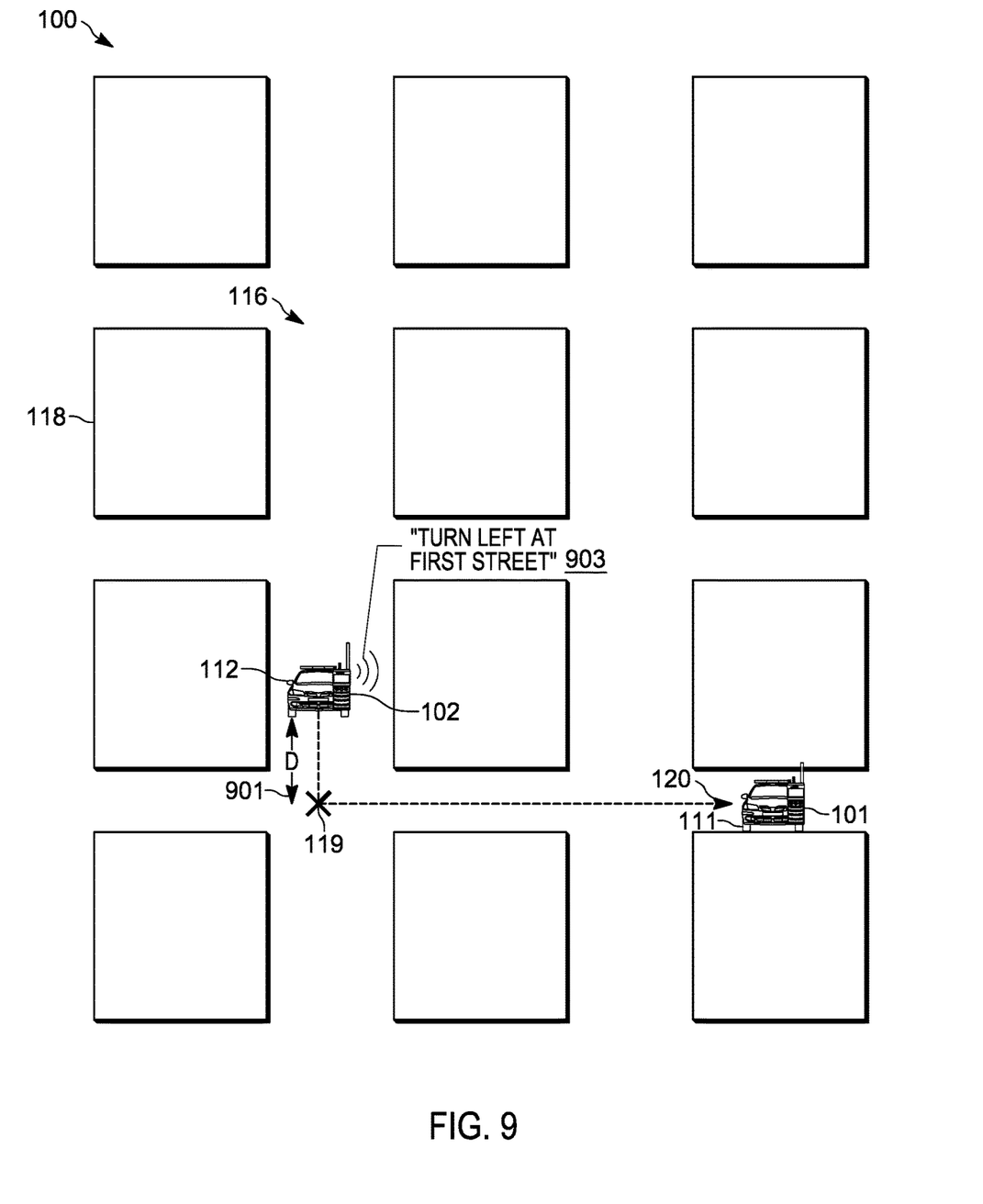
FIG. 9 depicts the follower audio device playing the audio information at a speaker when a current location is at about the associated location in accordance with some embodiments.

For example, attention is directed to FIG. 9, which is substantially similar to FIG. 1, with like elements having like numbers. However, in FIG. 9, the leader audio device 101 has continued to travel along the path 120 (e.g. as transported by the vehicle 111), and the follower audio device 102 has continued to travel (e.g. as transported by the vehicle 112) towards the geographic location 119. In some embodiments, as depicted, the link 104 may be gone and/or at least temporarily inoperative.

As depicted, the follower audio device 102 is within a given distance 901 (also labelled "D" in FIG. 9) of the geographic location 119. As the geographic location 119 corresponds to the associated location 505 (e.g. the associated location 505 includes coordinates of the geographic location 119), and as the current location of the follower audio device 102 is within the given distance 901 of the associated location 505, the follower audio device 102 is depicted as playing the audio information 503 as sound 903 (e.g. "Turn Left At First Street"), which causes the speaker 326 to play instructions on how to navigate at the geographic location 119.

Hence, the follower device 102 provides navigation instructions pertinent to the geographic location 119 regardless of whether the link 104 is operational, and furthermore is independent of the follower device 102 having a display device 346. Navigation along the path 120 is further independent of physical markers as a user of the follower audio device 102 will understand that the next left turn is to be taken regardless of whether there are signs for "First Street" or not.

The given distance 901 may be fixed and/or may be based on a speed of the follower audio device 102; for example, the given distance 901 may increase as a speed of the follower audio device 102 increases, and similarly, the given distance 901 may decrease as a speed of the follower audio device 102 decreases. The speed may be tracked by the controller 320 using the location determining device 325 and an internal clock (not depicted), and/or a speed determining device such as an accelerometer and the like (not depicted).

For example, the given distance 901 may be a fixed distance of about 10 meters; alternatively, the given distance 901 may be a distance of about 10 meters at a speed of 50 km/hr, with the given distance 901 increasing and decreasing as the speed increases and decreases. The given distance 901 may also be set manually at the application 323, for example by a user of the follower audio device 102. In any event, the given distance 901 is selected such that a driver of the vehicle 112, and/or a user of the follower audio device 102, who is hearing the audio information 503 being played by the speaker 326, has time to implement the navigation instructions in the audio information 503.

However, the follower audio device 102 may alternatively play the audio information 503 at the speaker 326 when current location 705 about matches associated location 505. Indeed, the mode in which the follower audio device 102 plays the audio information 503 be manually set at the follower audio device 102; for example, a speed dependent mode (e.g. a variable given distance 901) may be suitable for users transporting the follower audio device 102 in a vehicle, while a speed independent mode (e.g. a fixed given distance 901) may be suitable for users transporting the follower audio device 102 on foot and/or while hiking.

The method 400 may repeat at the follower audio device 102, for every instance of the leader audio device 101 transmitting audio information with an associated location to the follower audio device 102, such that the follower audio device 102 automatically plays navigation instructions at about each location where the leader audio device 101 has transmitted navigation instructions. Hence, when a user of the follower audio device 102 loses sight of a vehicle and/or a user transporting the leader audio device 101, a user of the follower audio device 102 may continue to follow the path taken by the leader audio device 101.

While example embodiments have been described with respect to the follower audio device 102 configured to receive audio information from one leader audio device 101, in other embodiments, the follower audio device 102 may be receiving audio information from more than one leader audio device, for example each taking different paths. As such, in some embodiments, the controller 320 may be configured to control the speaker 326 to play, in addition to the audio information, an identifier of a leader audio device from which the audio information is received, such that a user of the follower audio device 102 may determine whether or not to follow navigation instructions in the audio information.

In some of these embodiments, a message (similar to the message 507) includes an identifier of a leader audio device transmitting the message, such that the follower audio device 102 may identify the leader audio device from which the audio information was received and control the speaker 326 to play, in addition to the audio information, an identifier of the leader audio device. The played identifier may be the same identifier received in the message and/or a natural language alias, and the like, which may be determined using a lookup table (not depicted) which may be stored at the memory 322.

Described herein is a device and method for convoy navigation in which audio information transmitted on a narrowband communication channel is played when a follower audio device, receiving navigation instructions from a leader audio device, at about location where the navigation instructions were transmitted. As such, convoys may travel through an environment without users of follower audio devices needing to maintain visual contact with a leader audio device and/or otherwise making a note of navigation instructions received from the leader audio device. Such convoy navigation may be useful for responders travelling in a convoy in urban environments, especially when the responders get separated. Such convoy navigation may be useful for hikers travelling in a convoy in wilderness environments, especially when the hikers get separated and may not be able to rely on physical markers for navigation. Furthermore, the convoy navigation functionality described herein is particularly useful for audio devices lacking a display device as navigation instructions are provided using a speaker.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of at least two items X, Y, and Z (e.g., XYZ, XY, YZ, ZZ, and the like). Similar logic can be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A follower audio device comprising:
a memory; a speaker; a communication interface; a location determining device; and
a controller configured to:
track, using the location determining device, a current location of the follower audio device;
receive, from a leader audio device, via the communication interface, on a narrowband communication channel for public safety narrowband (PSNB) voice communications, audio information and an associated location of the leader audio device, the associated location indicative of where the leader audio device transmitted the audio information, the audio information received with the associated location in one or more of a control message and a header of a voice message transmitted from the leader audio device to the follower audio device on the narrowband communication channel, the audio information and the associated location are received from the leader audio device prior to the current location of the follower audio device being at the associated location;
store, at the memory, the audio information and the associated location;
and
when the current location of the follower audio device is at about the associated location, control the speaker to play the audio information.

2. The follower audio device of claim 1, wherein one or more of the audio information and the associated location of the leader audio device is embedded in the control message received from the leader audio device.

3. The follower audio device of claim 1, wherein the header includes trigger data which causes the controller to store the audio information.

4. The follower audio device of claim 1, wherein the header includes trigger data which causes the controller to store any audio information received with a respective associated location, for playback at the speaker at the respective associated location.

5. The follower audio device of claim 1, wherein the controller is further configured to determine that the current location of the follower audio device is at about the associated location when the current location of the follower audio device is within a given distance of the associated location.

6. The follower audio device of claim 5, wherein the given distance is based on a speed of the follower audio device.

7. The follower audio device of claim 6, wherein the given distance increases as a speed of the follower audio device increases.

8. The follower audio device of claim 1, wherein the controller is further configured to refrain from immediately playing the audio information until the current location of the follower audio device is at about the associated location.

9. The follower audio device of claim 1, further comprising an input device switch configured to turn off storing of the audio information.

10. A method comprising:
tracking, using a location determining device of the follower audio device, a current location of the follower audio device;
receiving, at a controller of a follower audio device, from a leader audio device, via a communication interface, on a narrowband communication channel for public safety narrowband (PSNB) voice communications, audio information and an associated location of the leader audio device, the associated location indicative of where the leader audio device transmitted the audio information, the audio information received with the associated location in one or more of a control message and a header of a voice message transmitted from the leader audio device to the follower audio device on the narrowband communication channel, the audio information and the associated location are received from the leader audio device prior to the current location of the follower audio device being at the associated location;
storing, at a memory of the follower audio device, the audio information and the associated location;
and
when the current location of the follower audio device is at about the associated location, controlling a speaker of the follower audio device to play the audio information.

11. The method of claim 10, wherein one or more of the audio information and the associated location of the leader audio device is embedded in the control message received from the leader audio device.

12. The method of claim 10, wherein the header includes trigger data which causes the controller to store the audio information.

13. The method of claim 10, wherein the header includes trigger data which causes the controller to store any audio information received with a respective associated location, for playback at the speaker at the respective associated location.

14. The method of claim 10, further comprising determining, at the controller, that the current location of the follower audio device is at about the associated location when the current location of the follower audio device is within a given distance of the associated location.

15. The method of claim 14, wherein the given distance is based on a speed of the follower audio device.

16. The method of claim 15, wherein the given distance increases as a speed of the follower audio device increases.

17. The method of claim 10, further comprising refraining from immediately playing the audio information until the current location of the follower audio device is at about the associated location.

18. The method of claim 10, further comprising turning off storing of the audio information via an input device switch.

* * * * *